Dec. 29, 1970 L. L. AZURE, JR 3,550,290

OUTPUT RECORDING SYSTEM

Filed June 24, 1968 4 Sheets-Sheet 1

INVENTOR
LEO L. AZURE, JR.

BY Irons, Birch, Swindler & McKie
ATTORNEYS

Dec. 29, 1970 L. L. AZURE, JR 3,550,290

OUTPUT RECORDING SYSTEM

Filed June 24, 1968 4 Sheets-Sheet 2

Dec. 29, 1970 L. L. AZURE, JR 3,550,290

OUTPUT RECORDING SYSTEM

Filed June 24, 1968 4 Sheets-Sheet 3

United States Patent Office 3,550,290

Patented Dec. 29, 1970

3,550,290

OUTPUT RECORDING SYSTEM

Leo L. Azure, Jr., Richland, Wash., assignor to Automata Corporation, Richland, Wash.

Filed June 24, 1968, Ser. No. 739,257
Int. Cl. G09b 5/00; G06k 3/00
U.S. Cl. 35—48 17 Claims

ABSTRACT OF THE DISCLOSURE

A system for producing a composite record for item analysis of scoring results for test problems having multiple choice responses. Incorrect answer responses are distinguished from correct, and the mode of error indicated.

BACKGROUND OF THE INVENTION

Field of the invention

This invention relates to examination grading and analyzing apparatus and, more particularly, to such apparatus for use with examinations having problems of the multiple choice answer type for producing a composite record of the scoring results, adapted for item analysis.

Description of the prior art

The use of test cards or sheets for recording indicia representing responses to multiple choice test problems or questions, and methods and apparatus for automatically grading and marking such test cards for scoring purposes, are well known in the prior art. Examples of such prior art teachings are set forth in U.S. Pat. No. 3,284,929, issued Nov. 15, 1966 to Leo L. Azure, Jr., for "Test Grading Machine" and copending U.S. patent applications for "Test Grading and Marking Method and Apparatus," Ser. No. 621,275, now Pat. No. 3,487,560, issued Jan. 6, 1970, of Hassfurther and Gates, and Ser. No. 621,747, now Pat. No. 3,487,561, issued Jan. 6, 1970 of Azure and Hassfurther, both filed Mar. 7, 1967. Each of the systems of the noted patent and pending applications employs a test card having a plurality of response indication areas corresponding to the multiple choice responses of each problem on the test. Storage means are provided for storing the correct responses to the problems. Logic means compare each answer response indicated on the test sheet with the corresponding correct answer response derived from the storage means to determine whether the response indicia of the test cards represent correct or incorrect responses for the problems.

Each of these prior art systems further provides means for marking the test cards in the event that response indicia do not represent correct answers to the problems, and means for scoring individual test cards and the test cards of an entire class. The class, of course, may represent any number of test cards corresponding to a given examination, and may, for example, comprise the test cards of a class of students taking the same examination.

The systems of the patent and the copending applications are designed to accommodate output equipment such as data processing systems and computers for processing of the score information. Suitable equipment for these purposes has not been available in the prior art, or is undesirably complex and expensive. Further, such equipment has not been fully compatible with basic test scoring mechanisms and thus has not realized the desired economy and operating capability. Furthermore, the prior art has not provided suitable output equipment for facilitating an item analysis of the scored responses.

SUMMARY OF THE INVENTION

This invention provides for producing a composite record of the scoring results, or the scored responses, to test problems of the multiple choice response type. The composite record facilitates a statistical item analysis of the scored responses. The system of the invention is designed to be compatible with automated test grading and scoring apparatus, which, for example, may be of the type disclosed in the above-noted U.S. Pat. No. 3,284,929 and copending U.S. patent applications Ser. No. 621,275 and Ser. No. 621,747. However, it will be apparent that the system of the invention may itself incorporate suitable grading apparatus. The system of the invention satisfies a need for economical and efficient systems for the analysis of scoring results from examinations having multiple choice problems and is compatible with heretofore existing systems employed in the grading and scoring of such examinations.

In accordance with the invention, the recording means includes recording elements individually operable to record a symbol distinguishing correct from incorrect responses and identifying the mode of error in each incorrect response. The recording means significantly includes recording elements for recording symbols identifying a specific incorrect answer response, the complete omission of an answer response for a given problem, or the erroneous provision of multiple answer responses. A logic system determines whether the problems are answered correctly or incorrectly, and the mode of error for incorrectly answered problems. Means selectively actuate the recording elements to record a symbol on an appropriate position of the composite record sheet for identifying the mode of error of each incorrect answer response for each test problem. The actuating means actuates the recording element corresponding to the incorrect answer response for each incorrectly answered problem. An inhibit circuit is controlled by the logic system to inhibit the actuating means for preventing the recording of response-identifying symbols for all correctly answered problems. The inhibiting circuit also responds to the logic system to prevent the recording of response identifying symbols for problems answered incorrectly due either to the total omission of responses, or to the erroneous provision of multiple responses. Correct answers are thus distinguished by the absence of an error symbol. If desired, a suitable symbol representing the provision of a correct answer response for each problem may be provided.

The composite record produced by the recording means presents the scoring results from an entire class of cards, with the response symbols for individual problems aligned in vertical columns and the symbols for each of the plurality of test cards aligned in horizontal rows. Additional tabulations such as total correct response and total incorrect response counts for each problem may be provided on the composite record and the cards may be automatically coded for identification with the composite record and with further stages of processing.

The apparatus of the invention therefore provides a highly useful tool for the efficient and accurate analysis of scoring results from multiple choice problem examinations. The use of automated grading and scoring techniques is very important, for example, to educators who must handle an ever-increasing number of students. The apparatus of the invention furthers this desirable end by automating the compilation and recording of scoring results for multiple choice examinations and thereby facilitating the item analysis of these results. This function, in many ways, is as essential to the realization of the full benefits of multiple choice testing techniques as is the provision of an initial, automated grading and scoring function. The system of the invention provides for the performance of this function in an accurate, yet economical and rapid manner.

These and other advantages and features of the invention will become more apparent and be more readily understood from the following detailed description of the invention.

BRIEF DESCRIPTION OF THE DRAWNGS

Figure 1:
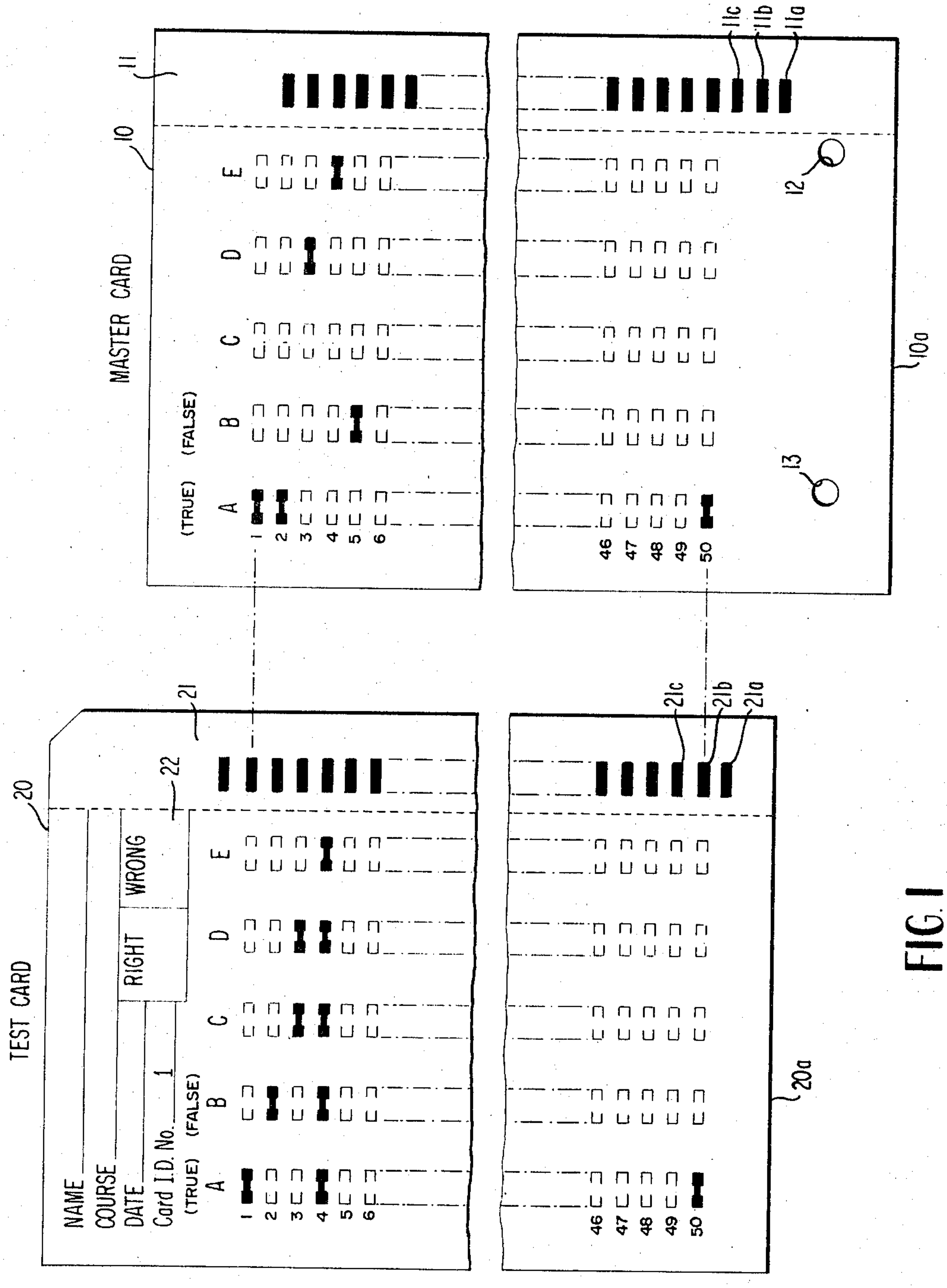
FIG. 1 shows, in partial portion, a master card and a test card suitable for use with the output recording system of the invention.
Figure 5:
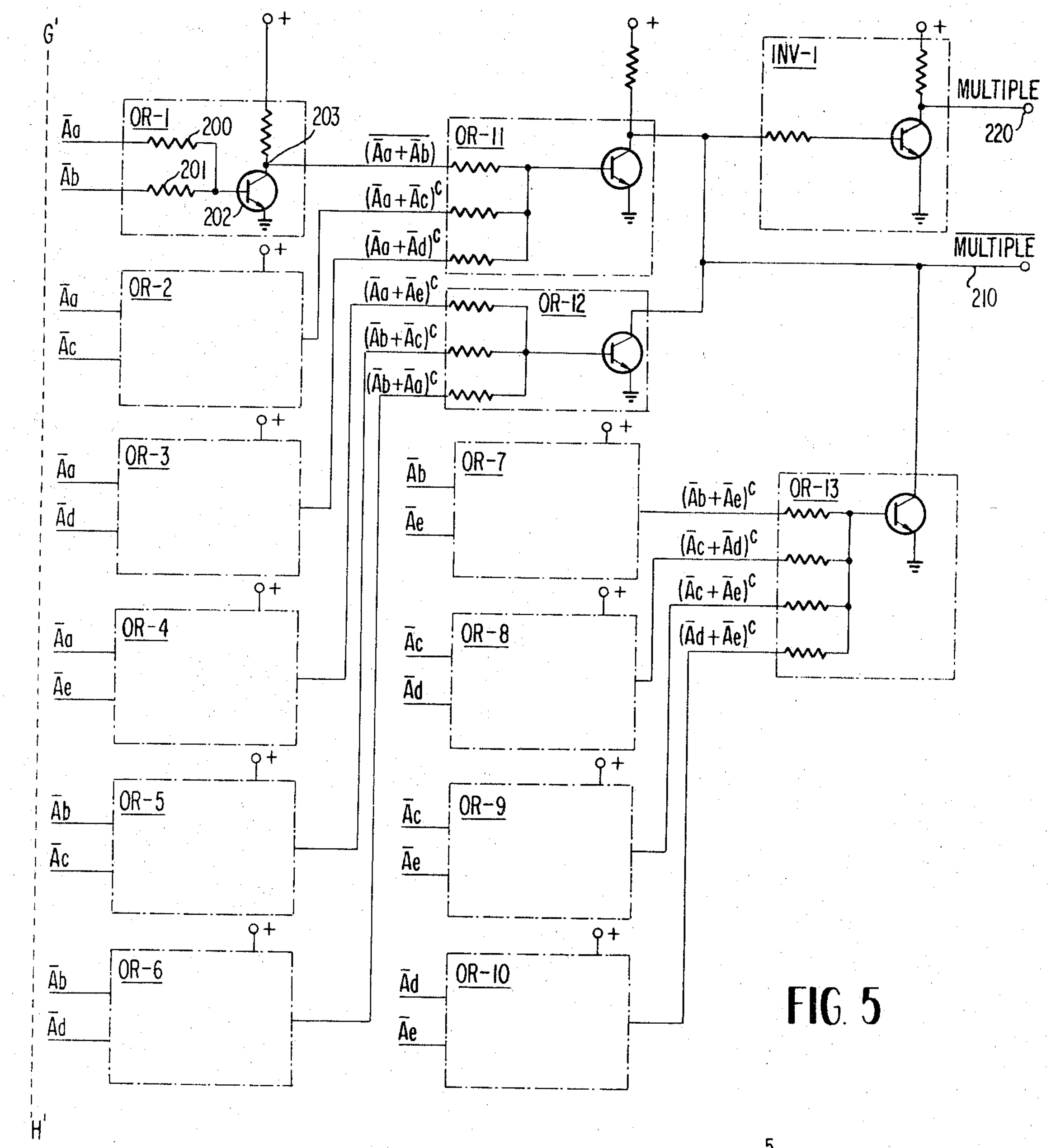
Figure 3:
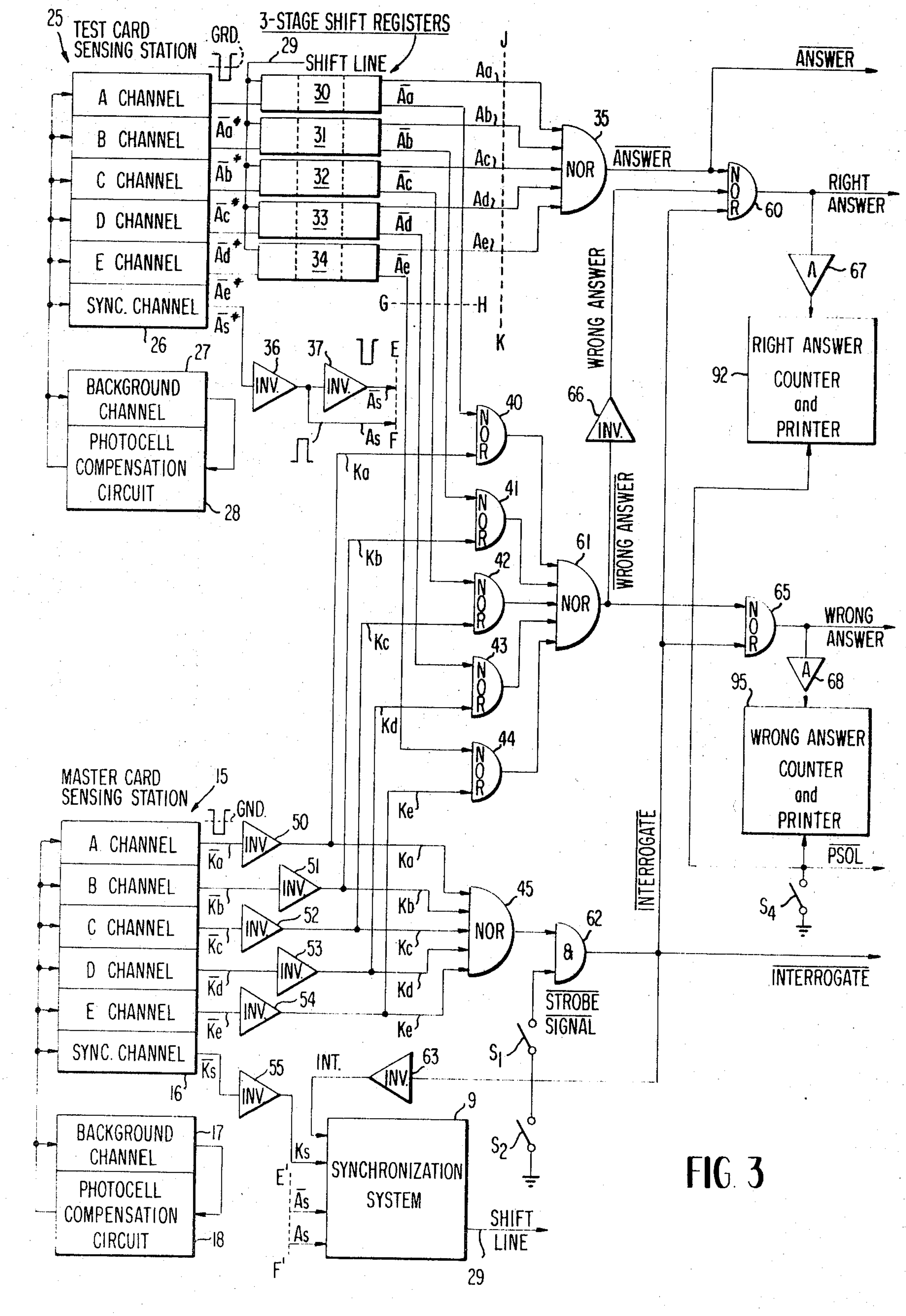
Figure 4:
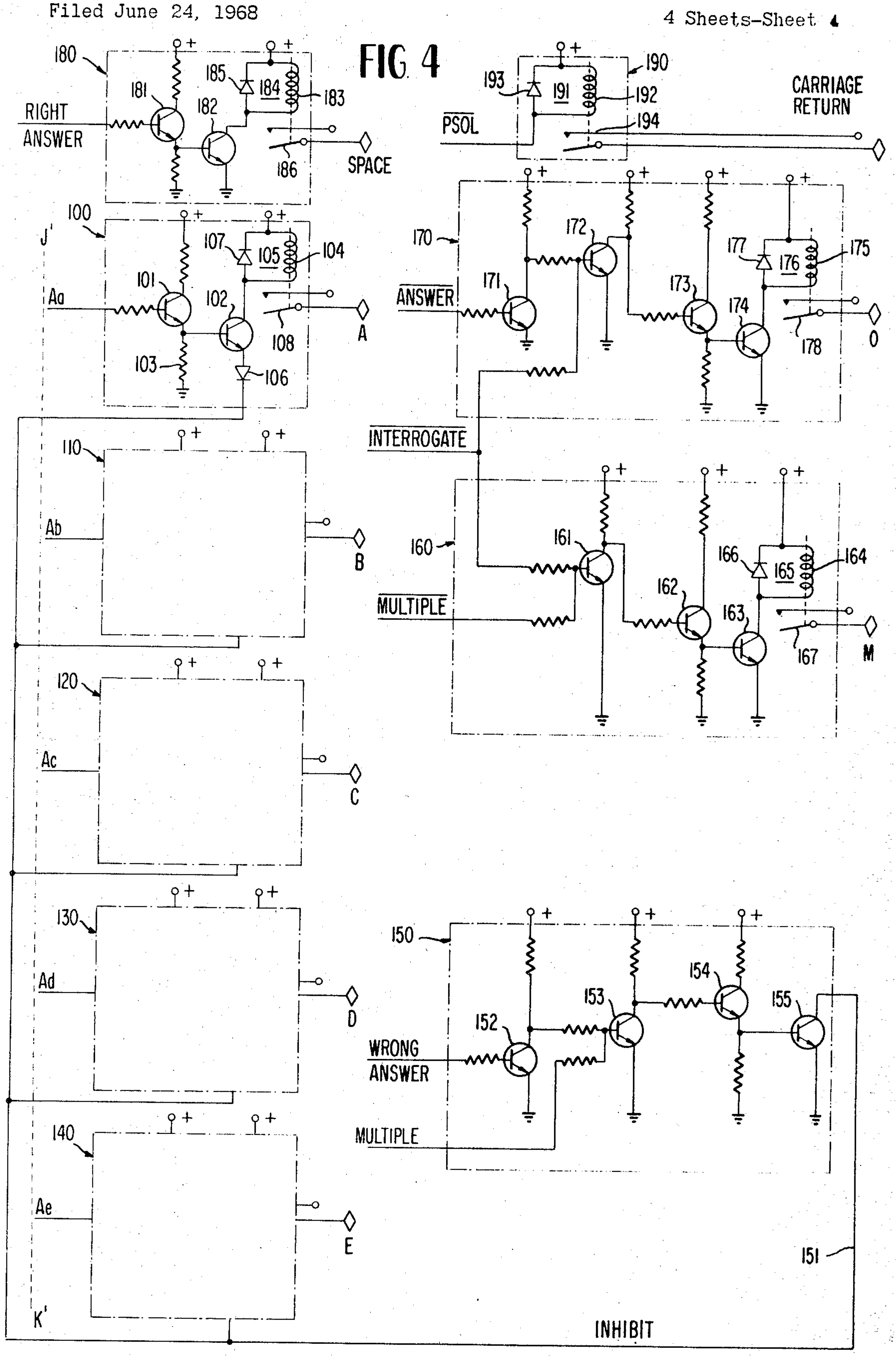

FIG. 3 comprises a logic block diagram of an apparatus suitable for scoring and grading the test cards of FIG. 1 and compatible with the output recording system of the invention; and FIGS. 4 and 5 comprise circuit schematics, partially in block diagram form, of an embodiment of the output recording system of the invention.

DETAILED DESCRIPTION OF THE INVENTION

The output recording system of the invention provides for producing a composite record of scoring results of answers to test problems having multiple choice responses. The composite record provides a convenient visual inspection of the scoring results and is adapted to facilitate item analysis of the results. The answers are represented by suitable indicia and are scored by comparison of the indicated answer responses with correct responses provided from a suitable storage means. In the specific embodiment of the invention disclosed herein, the answer responses to be scored and analyzed are presented as indicia applied to appropriate answer indication areas on test cards, and the correct responses are presented as indicia which may be similarly applied to master cards. Systems utilizing such cards for recording response indicia are disclosed in copending U.S. patent applications Ser. No. 621,275 and Ser. No. 621,747. Various other systems for presenting response indicia may be employed in the practice of the invention. For example, in U.S. Pat. No. 3,284,929 for "Test Grading Machine" a plugboard is employed for the master storage of correct responses. In all of these systems, the responses indicated on the test card are compared with those indicated in the master storage means for grading the answer responses to each problem for each test card.

In FIG. 1 there is shown a master card 10 and a test card 20. The cards 10 and 20 include, in an identical configuration, a plurality of response, or answer indication areas arranged in vertically aligned columns labelled A through E and laterally aligned rows numbered 1 through 50. The row numbering 1 through 50 corresponds to the numbering of problems of a test and the labelling A through E corresponds to the multiple response choices for each problem. As indicated, the cards may be employed with true-false examinations requiring the use only of two columns, such as A and B, or with multiple choice problems having from two to five multiple choice responses. Any desired number of problems and multiple choice responses may be accommodated by suitable modifications, as will be apparent.

In FIG. 1, indicia have been applied to each of the cards 10 and 20 to represent predetermined correct responses on the master card 10 and a variety of correct and incorrect responses on the test card 20. For example, the response indicia in column A for problem 1 of the test card 20 corresponds to that of the master card 10 and therefore the indicated response for problem 1 is correct. A similar comparison shows that problems 2 and 3 are answered incorrectly. Problem 4, for which multiple responses are indicated on the test card, and problem 5, for which responses are totally omitted, would be scored as incorrectly answered.

Figure 2:
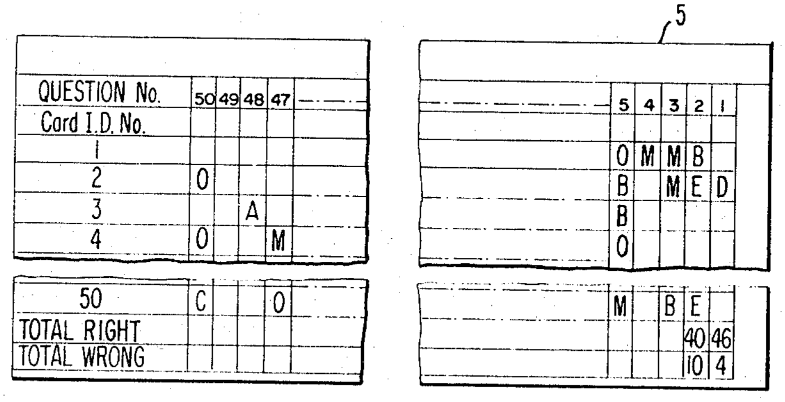
FIG. 2 shows, in partial portion, a composite record produced by the output recording system of the invention.

The recording apparatus employed in the system of the invention may comprise a conventional remote control typewriter in which key actuation is effected through appropriate electrical signals. The record sheet 5 of FIG. 2 completed by such a typewriter comprises a composite record of scoring results produced by the output recording system of the invention, and may provide for identification of the examination and class of test cards with which it is employed. For a purpose to be described, the test and master cards are scored in reverse numerical order of the columns. Therefore, for convenience, the questions are identified in reverse order from left to right on the record sheet 5, corresponding to a typical typewriter format. The results of each test card are presented in each horizontal column and, as illustratively indicated, test cards 1 through 50 are identified on the sheet 5. Correct answers are distinguished from incorrect answers by the absence or presence, respectively, of a symbol in the problem-numbered column of the row corresponding to each test card, and the mode of error is indicated by the particular symbol entered.

Assuming that the test card 20 of FIG. 1 corresponds to the first test card listed as test card No. 1 on the examination sheet 5, the significance of the mode of error recording will be readily apparent. For example, since problem 1 was answered correctly on test card 20, the space on sheet 5 corresponding to problem 1 for test card 1 is empty. To the contrary, problem 2 is answered incorrectly as indicated by the response indicia in column B and the corresponding symbol B is imprinted in the horizontal row for test card 1, in the vertical column corresponding to problem 2. By a similar analysis, the symbol M representing the incorrect multiple answer response is recorded for problem 3 and 4, and the symbol O representing an omitted answer response is recorded for problem 5.

Sheet 5 may provide for recording various other tabulations, such as the total number of right and the total number of wrong responses to each problem for the entire class of test cards. Although no means for effecting such count accumulation of correct and incorrect responses is provided in the present invention disclosure, various systems may be used for this purpose. An example of a particularly suitable system is provided in the copending patent application of Leo A. Azure, Jr., Ser. No. 739,256, filed June 24, 1968, and entitled "Automatic Response Counter."

The sophisticated grading and marking apparatus of the above-noted pending applications and patent provides for numerous functions not necessary to the practice of the present invention. However, since the apparatus of the present invention is compatible with this apparatus, it is convenient to disclose and describe herein a similar synchronization and logic comparison system for the scoring of test cards.

The cards of FIG. 1 correspond to those designed for use with the test grading and marking apparatus of the above-noted, copending applications. Thus, the cards 10 and 20, respectively, include a vertical column of timing or synchronization marks 11*a*, 11*b* . . . 21*a*, 21*b* . . . . Test card 20 further includes a score area 22 in which the number of right (correct) and the number of wrong (incorrect) responses are automatically printed upon completion of grading and marking of the test card. Master card and test card sensing stations are provided through which the cards 10 and 20, respectively, are advanced in reverse direction, i.e., with the bottom edges 10*a* and 20*a* leading. The master card 10 may include apertures 12 and 13 by which it is attached to a rotating drum for continuous rotation through the master card sensing station in timed relation with the advancement of successive test cards 20 through the test card sensing station.

With reference to the scoring apparatus shown in block diagram in FIG. 3, the master card and the test card sensing stations 15 and 25 include channels A through E for sensing the corresponding columns A through E of response indication areas and sync channels 16 and 26, respectively, for sensing the corresponding columns 11 and 21 of timing marks on the master card 10 and test card 20. The sensing stations may include optical scanners and photocell sensors which detect the presence of response indicia in the corresponding indication areas for each problem, individually and in sequence. Each station may also include a background channel 17, 27 and a photocell compensation circuit 18, 28 which adjusts the sensitivity of the optical scanning systems in accordance with the optical surface characteristics of the cards.

Various conventional logic notations are indicated in FIG. 3 and throughout the remainder of this specification. For example, a false condition $\overline{A}a$ corresponds to a true condition A*a*. In addition, the convention is adopted that a false condition is represented by a ground potential or a negative potential pulse, and a true condition is represented by a positive potential pulse.

The outputs of the test card sensing station 25 are identified by the logic conditions $\overline{A}a^*$ through $\overline{A}e^*$ and $\overline{A}s^*$, and of the master card sensing station 15 by the logic conditions $\overline{K}a$ through $\overline{K}e$ and $\overline{K}s$, corresponding in each case to the response columns A through E and to the columns of timing marks 21 and 11 of the test card 20 and master card 10, respectively. A false condition output, and thus a ground potential pulse represents the detection of the corresponding answer indicia or timing mark, whereas a true condition, or positive potential signal, represents the absence of such indicia or timing mark detection.

The outputs $\overline{A}a^*$ through $\overline{A}e^*$ of channels A through E of station 25 are applied to respectively associated three-stage shift registers 30 through 34. The shift registers coupled with the synchronization circuit 9, provide for a substantial degree of out-of-synchronized operation in the transport and sensing operations of the master and test cards. The limits of the out-of-sync operation are best defined by reference to the timing or sync marks 11 and 21. The limits imposed by the apparatus require that a given timing mark, such as mark 21*b* of test card 20, be detected after detection of the timing mark 11*a* preceding the detection of the corresponding mark 11*b* of the master card 10, and before the detection of the following or subsequent timing mark 11*c*. The signals representing the condition $\overline{A}s^*$ detected by sync channel 26 are inverted by inverters 36 and 37 to produce the conditions A*s* and $\overline{A}s$ which are applied to synchronization system 9. Similarly, the condition $\overline{K}s$ from sync channel 16 is inverted by inverter 55 to provide signals representing the condition K*s* which is also applied to synchronization system 9. A signal representing an interrogation condition, to be described, and which generally designates the actual detection of an answer pulse from the master card, is also applied to synchronization system 9. The system 9 produces a shift pulse on shift line 29 which is applied to shift registers 30 through 34. Each shift pulse advances the state of a given stage of each of the shift registers to the next succeeding stage and clears the first stage of each shift register. The last stage of each shift register therefore presents the response information detected in its corresponding column of the test card for the full synchronization interval between two successive shift pulses and two intervals following the interval in which it was initially detected. The shift register outputs simultaneously present the conditions A*a* through A*e* and the inverted conditions $\overline{A}a$ through $\overline{A}e$. The waveform and duration of the pulses representing the conditions $\overline{A}a^*$ through $\overline{A}e^*$ are dependent on the physical configuration of the indicia detected from the test cards and the transport speed thereof through the sensing station. The outputs of the shift registers present the identical information as the inputs but the waveform and duration of the pulses is determined by the shift registers and the repetion rate of the shift pulses.

The output signals of shift registers 30 through 34 representing the conditions A*a* through A*e* are applied to NOR gate 35. NOR gate 35 produces a true output only if all inputs are false and therefore produces a positive potential output pulse representing the true condition $\overline{\text{ANSWER}}$ only if all of the input conditions A*a* through A*e* are false. A true condition $\overline{\text{ANSWER}}$ corresponds to the omission of answer response indicia for a given problem on the test card.

The output representing conditions $\overline{A}a$ through $\overline{A}e$ are applied to NOR gates 40 through 44 in combination with the output signals of the channels of the master card sensing station 15, as inverted by inverters 50 through 54, and representing the conditions K*a* through K*e*, respectively. NOR gates 40 through 44 produce true outputs only if both inputs are false and thus only if an answer response from the test card is not matched by the corresponding answer response from the master card. NOR gate 61 similarly combines the outputs of NOR gates 40 through 44 to produce an output signal for the condition $\overline{\text{WRONG ANWSER}}$ which is true if no wrong answer is detected and false if a wrong answer is detected.

Signals representing the conditions K*a* through K*e* are also applied to NOR gate 45, the output of which is applied as an enabling input to AND gate 62. AND gate 62 is enabled only in response to two false inputs and thus only for the condition that one of the logic states K*a* through K*e* is true, whereby NOR gate 45 would produce a false output. A false condition $\overline{\text{STROBE SIGNAL}}$ is produced when both the switches $S_1$ and $S_2$ are closed. $S_1$ and $S_2$ are closed when the master and test cards, respectively, have advanced into response sensing positions within their respective sensing stations. When AND gate 62 is enabled, its output condition $\overline{\text{INTERROGATE}}$ is false, corresponding to a true INTERROGATE condition. The response comparison may occur only during a true INTERROGATE condition, thereby eliminating erroneous logic comparison operations due to inadvertent but technically unavoidable sensing signals erroneously indicating the detection of response indicia.

The output of NOR gate 61 is inverted by inverter 66 and applied as a WRONG ANSWER condition input to NOR gate 60, in combination with the $\overline{\text{ANSWER}}$ output of NOR gate 35 and the $\overline{\text{INTERROGATE}}$ output of AND gate 62. NOR gate 60 produces a true RIGHT ANSWER output only when all of the input conditions are false and thus only when simultaneously with the INTERROGATE condition an answer which is not a wrong answer is detected. RIGHT ANSWER pulses amplified by amplifier 67 actuate right answer total counter and printer 92.

The $\overline{\text{WRONG ANSWER}}$ output of NOR gate 61 and the $\overline{\text{INTERROGATE}}$ output of AND gate 62 are applied to NOR gate 65 which produces a WRONG ANSWER output which is true when both these input conditions are false. Pulses representing true WRONG ANSWER conditions, amplified by amplifier 68, actuate wrong answer total counter and printer 95.

An omitted answer is distinguished from right and wrong answers. The occurrence of a false $\overline{\text{INTERROGATE}}$ condition, effecting the logic comparison operation, simultaneously with false WRONG ANSWER condition, representing no wrong answer, and a true $\overline{\text{ANSWER}}$ condition, representing the omission of answer responses results in neither a true RIGHT nor a true WRONG ANSWER condition. The system thereby identifies and distinguishes the omission of answer responses for a given problem.

Switch $S_4$ is controlled by the transport system of the grading apparatus to be opened while the test card is advancing through the sensing station and to be closed as the trailing edge of the test card leaves the station. When closed, switch $S_4$ completes a circuit to ground, producing a false $\overline{\text{PSOL}}$ condition and comprising a total print control signal for the counters 92 and 95 to effect printing out of their respective count accumulations in the score area 22 of the test card 20. The number of omitted answers may thereby be determined by the difference of the sum of right and wrong answers and the total number of problems in the examination for each test card.

The system described thus far provides for grading each problems of each test card and generating output signals representing the grading results. The circuits of FIG. 4 and 5 respond to these output signals to produce control signals effecting selective actuation of recording elements of a suitable recording means for producing a composite record of the grading results. The recording means conveniently may comprise a remote control typewriter. As noted, the system of the invention may incorporate the system of FIG. 3 as an integral unit, or may comprise an auxiliary system compatible with a basic test grading and scoring apparatus providing the grading result outputs.

In FIG. 4, positive potential pulses representing the detection of answer indicia corresponding to true conditions A*a* through A*e* are applied to actuating circuits 100, 110, 120, 130, and 140, respectively. These actuating circuits produce control signals at their respective output terminals A through E which actuate associated recording elements for recording the corresponding symbols A through E on the composite record sheet.

Circuit 150 normally inhibits the actuating circuits 100 through 140 from generating control signals. In accord with this purpose, circuit 150 normally produces a true INHIBIT output on line 151. When the WRONG ANSWER input condition is false, the INHIBIT condition is true; conversely, when the WRONG ANSWER condition is true, the INHIBIT condition is false. For multiple answers, WRONG ANSWER will also be false but the MULTIPLE condition is true, again producing a true INHIBIT condition since the individual symbols A through E are not to be recorded but rather the multiple symbol M. Thus, although the actuating circuits 100 through 140 receive a first enabling input A*a* through A*e* for each problem for which answer indicia are detected, they are inhibited from producing control signals where the indicia are either representative of correct answers to the problems, or are provided in multiple for a single problem. Actuating circuits 160 and 170 produce control signals at the terminals labelled M and O for actuating the corresponding recording elements to identify, on the record sheet 5 of FIG. 2, problems answered incorrectly due to the provision of multiple answer responses and the omission of answer responses, respectively.

The input signals representing the conditions MULTIPLE and $\overline{\text{MULTIPLE}}$ and which are applied to the circuits 150 and 160, respectively, are derived from the circuit shown partially in schematic and partially in block diagram in FIG. 5. Referring concurrently to FIGS. 3 and 5, the $\overline{\text{A}}a$ through $\overline{\text{A}}e$ signal conditions derived from shift registers 30 through 34 are applied in various paired combinations to OR gates OR–1 through OR–10. Each of gates OR–1 through OR–10 produces a false output condition only when both of the input conditions are true.

The outputs of gates OR–1 through OR–10 are applied in various combinations to the inputs of the OR–11 through OR–13 gates. Each of gates OR–11 through OR–13 produces a true output only when all of its inputs are false and a false output when one or more of its inputs is true. The outputs of gates OR–11 through OR–13 are combined in a single output terminal labelled with the condition $\overline{\text{MULTIPLE}}$. Inverter INV–1 is connected to this output terminal to produce the inverted output MULTIPLE.

Referring to the foregoing circuits in detail, each of the actuating circuits 100 through 140 of FIG. 4 is identical in construction and therefore only circuit 100 has been shown in detail. Circuit 100 includes a transistor 101 connected in an emitter-follower configuration for controlling a power or switching transistor 102. The base terminal of transistor 102 is connected to the junction of the emitter terminal of transistor 101 and the emitter load resistor 103. The collector-emitter circuit of transistor 102 is connected in series with an energizing winding 104 of a relay 105 to a positive power supply terminal and through a diode 106 to the inhibit line 151. Diode 107 shunts the winding 104 in a conventional connection.

The normal, true INHIBIT condition on line 151 isolates the power circuit including diode 106 from ground, and thus prevents energization of winding 104 regardless of the state of conduction of transistor 101 responsive to the input pulse A*a*. In the false INHIBIT condition, the line 151 is clamped to ground. A complete circuit is thus established for enabling conduction of transistor 102 and energization of winding 104.

The inhibit circuit 150 includes grounded emitter transistors 152 and 153 responsive to the input signals representing the conditions WRONG ANSWER and MULTIPLE, respectively, an emitter-follower transistor 154 and a power or switching transistor 155. The inhibit line 151 is connected to the collector terminal of transistor 155 and is either isolated from ground or clamped to ground depending upon the non-conducting or conducting states of transistor 155. Transistor 152 is normally non-conducting and transistor 153 is normally conducting, whereby transistors 154 and 155 normally not conducting. A true WRONG ANSWER condition causes conduction of transistor 152 and produces non-conduction of transistor 153 and conduction of transistors 154 and 155. The resultant false INHIBIT condition is consistent with the presence of a wrong answer, and enables energization of the actuating circuit 100 through 140 corresponding to the wrong answer and generation of the appropriate control signal. In the presence of a true WRONG ANSWER condition, a true MULTIPLE condition will control and cause conduction of transistor 153 and non-conduction of transistors 154 and 155, thereby maintaining a true INHIBIT condition. The actuating circuits 100 through 140 are thereby inhibited, or disabled from producing control signals.

The actuating circuit 160 for producing a control signal to effect recording of the symbol M representing an erroneous multiple answer response employs resistor transistor logic requiring the simultaneous presence of pulses representing false $\overline{\text{INTERROGATE}}$ and false $\overline{\text{MULTIPLE}}$ conditions. The pulses representing these conditions are applied to the base of a grounded emitter, normally conducting transistor 161. The collector terminal of transistor 161 is connected to the base of transistor 162 and normally clamps the base of the latter to ground, maintaining it non-conductive. Transistor 162 is connected in an emitter-follower configuration for driving the switching or power transistor 163. The collector-emitter conducting path of transistor 163 is connected in series with the winding 164 of a relay 165. The conventional shunt diode 166 is connected across the winding 164. The relay 165 includes normally open contacts 167 which, when closed, provide the control signal for recording the symbol M.

As noted previously, the actuating circuits 100 through 140 are inhibited when multiple responses are provided and thus when the condition $\overline{\text{MULTIPLE}}$ is false. When both the $\overline{\text{INTERROGATE}}$ and $\overline{\text{MULTIPLE}}$ conditions are false, transistor 161 is rendered non-conductive, resulting in conduction of transistors 162 and 163, energization of the winding 164, and closing of the relay contacts 167.

Actuating circuit 170 produces a control signal to effect recording of the symbol O for the error of omitted responses when both of the input conditions $\overline{\text{ANSWER}}$ and $\overline{\text{INTERROGATE}}$ are false. Signals representing the $\overline{\text{ANSWER}}$ condition are applied to the base of normally non-conducting transistor 171. Signals representing the $\overline{\text{IN-}}$ $\overline{\text{TERROGATE}}$ condition also are applied to the base of the normally conducting transistor 172. The collector terminal of transistor 171 is connected to the base terminal of transistor 172, whereby when the latter is normally maintained non-conducting. Emitter-follower transistor 173 is connected at its base terminal to the collector terminal of transistor 172 and at its emitter terminal to the base of power or switching transistor 174. The collector-emitter circuit of transistor 174 is connected in series with winding 175 of relay 176 to a positive power supply terminal. A conventional shunting diode 177 is connected across the winding 175. The normally conducting transistor 172 clamps the base of transistor 173 to ground, normally maintaining transistor 173 and, in turn, transistor 174 non-conducting.

During the interrogate interval, $\overline{\text{INTERROGATE}}$ is false and the corresponding ground potential pulse tends to terminate conduction of transistor 172. However, if the $\overline{\text{ANSWER}}$ condition is false, transistor 171 remains non-conductive and the positive potential at its collector terminal maintains transistor 172 conductive so that no control signal is produced. However, if the $\overline{\text{ANSWER}}$ condition is true, the corresponding positive pulse causes conduction of transistor 171 which, with the false $\overline{\text{INTERROGATE}}$ condition, clamps the base of transistor 172 to ground terminating its conduction and causing conduction of transistors 173 and 174. The energized relay winding 175 closes its contacts 178 to produce the control signal for recording the symbol O.

As noted, no symbol is recorded for a right answer. Rather, there is produced a control signal for advancing the typewriter by one space. Actuating circuit 180 includes an emitter-follower transistor 181 which is normally non-conductive and which drives a power or switching transistor 182. The collector-emitter terminal of transistor 182 is connected in series with the winding 183 of relay 184 to a positive power supply terminal. A conventional shunt diode 185 is connected across winding 183. The relay 184 includes normally open contacts 186. In operation, a positive pulse representing a true RIGHT ANSWER condition produces conduction of transistor 181 and, in turn, conduction of transistor 182 for energizing winding 183. The energized winding 183 closes the contacts 186 to produce the space-control signal. If desired, of course, this control signal may effect the recording of a symbol, rather than the provision of a space to indicate correct answers.

At the completion of recording the scoring result symbols for all problems of a given test card, a carriage return signal is generated. The typewriter automatically returns the carriage to the column for problem 1 and advances it to the next successive horizontal row in preparation for recording response symbols for the next test card to be graded. The print control signal corresponding to the false $\overline{\text{PSOL}}$ condition generated by the switch S4 of FIG. 3 provides the input signal for actuating circuit 190 which generates the carriage return control signal. Circuit 190 includes a relay 191 comprising the winding 192 shunted by diode 193 and connected between the input terminal of circuit 190 and a positive power supply terminal. The false $\overline{\text{PSOL}}$ signal effectively connects the input terminal to ground for energization of winding 192 from the positive power supply terminal, thereby closing contacts 194 and providing the carriage return control signal.

FIG. 5 shows the circuits required for determining the MULTIPLE and $\overline{\text{MULTIPLE}}$ conditions. Briefly, resistor-transistor logic in the form of a plurality of OR gates OR–1 through OR–13 effects a comparison operation of signals representing detection of answer responses to determine whether multiple responses are provided for a given problem. An inverter circuit INV–1 inverts the $\overline{\text{MULTIPLE}}$ condition determined by the combined output of OR circuits OR–11, OR–12, and OR–13 to provide the inverted output condition MULTIPLE.

All of OR gates OR–1 through OR–10 are identical in construction and therefore the circuit of OR–1 only is shown. Input signals representing the conditions $\bar{A}a$ and $\bar{A}b$ are applied through the corresponding resistors 200 and 201 to the base of grounded emitter transistor 202. The output at the collector terminal 203 of transistor 202 comprises a signal satisfying the condition $(\overline{\bar{A}a+\bar{A}b})$. All of the OR gates in the circuit of FIG. 5 produce a true output only when each of the inputs is false. Thus, only if both of the input conditions $\bar{A}a$ and $\bar{A}b$ are false, indicating that answer responses were detected in both the A and B columns for the related problem, will there be produced a true output or positive signal at the terminal 203 of gate OR–1. Thus, the series of gates OR–1 through OR–10 effect comparison of each answer indication area with every other answer indication area for each problem on the test card. A true output from any of these gates represents a multiple response for that problem. Gates OR–11 through OR–13 combine the outputs of gates OR–1 through OR–10 to provide a signal on line 210 corresponding to the thus determined condition MULTIPLE. The condition on line 210 is inverted by the inverter-1 circuit to provide a signal representing the inverted condition MULTIPLE on line 220.

As noted above, an identifying number may be provided on each test card to facilitate its further processing and thus, for example, on the composite record sheet. Suitable printing counters may be employed for this purpose, generally of the type such as counters 92 and 95, which are advanced by a unit count for each test card. Such a counter may be provided in tthe test grading and scoring apparatus and may be incorporated in the remote control typewriter to record the identifying numbers. Any suitable actuation of the print operation may be provided. For example, the printing counter in the grading apparatus would be actuated simultaneously with the counters 92 and 95 and the counter in the typewriter may be actuated simultaneously immediately following the carriage return.

Numerous uses of the output recording system of the invention will be apparent. For example, the system may be employed in any of various types of tallying operations, such as for voting and public opinion polls. In such applications, and by analogy to the use of the system for multiple choice examinations, a plurality of candidates for a given office or a plurality of possible responses for a given question or inquiry correspond to the plurality of possible answers to an examination question in the specific application of the application hereinabove described. Thus, it will be understood that reference herein to problems or test questions, and to correct or incorrect answer responses thereto is intended to encompass any such form of multiple choice inquiry or selection and the corresponding responses. The capability of the system of the invention of indicating the mode of error will likewise be understood to find application in the automatic preparation of a composite record for voting or public opinion poll applications. For example, the multiple response indication will signify the erroneous selection of multiple candidates where only a single candidate is intended to be selected for a given office or where a single response to a public opinion poll is intended. Further, the system is ideally suited for applications wherein it is desired to identify the particular response to a given problem or inquiry where that response does not correspond to a desired or preselected response. In this context, therefore, the mode of error indication will be understood to encompass this capability of response identification in the composite record.

In summary, the output recording system of the invention incorporates simplified and trouble-free resistor-transistor logic circuits and simplified actuating circuits for generating control signals to effect recording of symbols distinguishing correct from incorrect responses and identifying the particular mode of error of incorrect responses. These control signals may selectively operate the recording elements, or keys, of a remote control typewriter for automatically producing the composite record sheet. The system of the invention also may include a test grading and scoring system, or may be provided as peripheral or auxiliary equipment for use with a basic grading and scoring system. The compatibility of the system of the invention with such basic systems enables minimizing costs while assuring simplified and trouble-free operation in a composite system providing desired scoring, grading, and analysis functions.

It will be evident that many minor changes may be made in the apparatus described herein, without departure from the scope of the invention. Accordingly, the invention is not to be considered limited by such description, but only by the scope of the appended claims.

What is claimed is:

1. A system for producing on a record sheet a composite record of the results of scoring responses to problems of the multiple choice type wherein symbols applied to problem-related positions of the record sheet distinguish correct and incorrect responses and identify the mode of error of incorrect responses, comprising:

recording means including recording elements selectively operable to record a symbol, and means for selectively actuating said recording means to record a symbol identifying the mode of error of the incorrect answer response for each incorrectly answered problem, said actuating means in at least one mode of error actuating said recording means to record a symbol identifying the incorrect answer response.

2. A system as recited in claim 1 wherein there is further provided:

means for inhibiting said actuating means from effecting symbol recording for each problem answered correctly.

3. A system as recited in claim 2 wherein:

said recording means further includes means for identifying the mode of error of multiple responses to a single problem, and said inhibiting means inhibits only said actuating means for the multiple choice response recording means.

4. A system as recited in claim 2 wherein:

said recording means includes means for identifying the mode of error of the omission of answer responses to a given problem.

5. A system as recited in claim 1 wherein there is further provided:

grading means including master and test sensing stations for sensing the multiple choice test answer responses and the correct master answers for each problem, and said grading means further includes means for comparing the sensed test and master answers to determine the correct and incorrect responses for each problem.

6. A system for producing a composite record of the results of scoring responses to problems of the multiple choice type wherein symbols applied to problem-related positions of the composite record distinguish correct and incorrect responses and the mode of error of incorrect responses, comprising:

recording means including recording elements individually operable to record as associated symbol, means for selectively actuating said recording elements to record a symbol identifying the mode of error of the incorrect answer response for each incorrectly answered problem, grading means including master and test sensing stations for sensing the multiple choice test answer responses and the correct master answers for each problem.

said grading means including means for comparing the sensed test and master answers to determine the correct and incorrect responses for each problem, said recording means including a recording element corresponding to each multiple choice response for recording a symbol identifying said multiple choice response, and said actuating means being controlled by the grading means to actuate the recording element corresponding to the multiple choice test answer response sensed for each problem by the test sensing station.

7. A system as recited in claim 6 wherein said grading means further includes:

a synchronization system for generating an interrogate interval operation in response to sensing of the correct master answer for each problem, and said grading means is operative to effect said comparison of master and test answers for each problem only during the related interrogate interval.

8. A system as recited in claim 7 wherein there is further provided means responsive to said grading means to inhibit said actuating means for each problem answered correctly.

9. A system as recited in claim 8 wherein there is further provided:

means responsive to said test sensing station for detecting the incorrect answer of multiple responses for a given problem, and said inhibiting means is controlled by said multiple response detecting means to inhibit said actuating means from actuating said response-identifying recording elements upon detection of an incorrect multiple response answer.

10. A system as recited in claim 9 wherein:

said recording means includes a recording element for recording a symbol identifying the incorrect answer of mutiple test responses for a single problem, and said actuating means is controlled by said mutiple response detecting means to actuate said recording element identifying multiple responses upon detection of an incorrect multiple response answer.

11. A system as recited in claim 10 wherein:

said multiple response detecting means comprises:

a first plurality of OR gates each of which compares the presence of an answer for each of two different multiple choices, and a second plurality of OR gates for comparing the outputs of said first plurality of OR gates to produce a combined output identifying the detection of multiple answer responses for a single problem.

12. A system as recited in claim 7 wherein there is further provided:

means responsive to said test sensing station and to said synchronization system of said grading means to detect the omission of answer responses for a given problem, said recording means includes a recording element for recording an error symbol identifying the omission of answer responses, and said actuating means is controlled by said omitted response detecting means to actuate the omitted response recording element for each problem answered incorrectly due to the omission of responses.

13. A system as recited in claim 7 wherein the test answer responses are represented by indicia applied to test cards and the master, correct answers are represented by indicia applied to master cards and each of said master and test cards includes answer indication areas which correspond to the multiple choice responses for each problem and to which the indicia are applied, and wherein:

said test sensing station advances a plurality of test cards therethrough, individually and sequentially, for sensing of the answer indicia thereon, said master sensing station repeatedly advances a master card therethrough for sensing of correct answer indicia for each problem in timed relationship with the sensing of the answer indicia from the successive test cards advanced through said test sensing station, and said synchronization system is responsive to the passage of the master and test cards in timed relationship through their respective sensing stations for generating the interrogate interval of operation.

14. A system as recited in claim 10 wherein:

said recording means comprises a remote control typewriter, and said selective actuation means produces control signals for remote actuation of the recording keys of said typewriter for recording the error identifying symbols.

15. A system as recited in claim 14 wherein:

said actuating means includes means responsive to said grading means for generating a space control signal for each correctly answered problem, and said typewriter responds to the space control signal to leave a blank space in each position of the composite record related to a correctly answered problem, and to advance to the next successive problem-related position.

16. A system as recited in claim 15 for grading, in succession, a plurality of tests including answer responses for a plurality of problems, wherein there is further provided:

means for generating a carriage return signal for said typewriter upon completion of recording the graded answer responses for each test.

17. A system as recited in claim 16 wherein the positions of said composite record are arranged in horizontal rows corresponding to each test and vertical columns corresponding to the problems, and wherein:

said typewriter is advanced through successive problem-related positions in each row in response to actuation by said control signals of said actuating means and is advanced through successive rows in response to the carriage return signals of said carriage return signal generating means.

UNITED STATES PATENTS

References Cited

| | | | |
|---|---|---|---|
| 3,267,258 | 8/1966 | Bene | 35—48(.2) |
| 3,050,248 | 8/1962 | Lindquist | 35—48(.2)X |
| 3,187,443 | 6/1965 | Schure et al. | 35—48X |
| 3,300,876 | 1/1967 | Johannsen | 35—48X |
| 3,314,172 | 4/1967 | Boyett | 35—48X |

WILLIAM H. GRIEB, Primary Examiner

U.S. Cl. X.R.

235—61.6